UNITED STATES PATENT OFFICE 2,155,307

SOLDERING AGENT

Wilhelm Hagemann, Bonn-on-the-Rhine, Germany; Emmy Hagemann, Bonn-on-the-Rhine, Germany, sole heiress of Wilhelm Hagemann, deceased, assignor to Küppers Metallwerk Kom.-Ges. Bonn.

No Drawing. Application October 31, 1936, Serial No. 108,679. In Germany November 2, 1935

4 Claims. (Cl. 148—25)

The soft soldering of aluminum articles offers considerable difficulties owing to the fact that the aluminum oxide covering the surface of the aluminum cannot, in contradistinction to most other metal oxides, be removed or reduced by the known soldering agents, such as soldering grease, resin, colophony, tartaric acid, citric acid and so forth. For this reason attempts have hitherto been made to remove the oxide layer which covers the aluminum before or during the soldering process itself by mechanical rubbing or chemical solution. Various agents have already been disclosed for the dissolution, the activity of the same as oxide-dissolving agents being based on the use of inorganic metal chlorides. For example the chlorides of zinc and calcium as well as of magnesium are used.

These corrosive agents however suffer from the drawback that the temperature at which the oxide-dissolving action sets in lies too high. The corrosive agent only acts when the solder has already been fused for a long time. Furthermore, by means of these corrosive agents soldered joints cannot be produced which are resistant to corrosion, since the original constituents of the agent remain at the soldered place in their original form or else in a form which has been changed by the heat of the soldering operation, and lead rapidly to corrosion phenomena. Also the salt residues, consisting essentially of oxychlorides, which remain behind when hydrochloric acid is split off from the corrosive agent also have a particularly disadvantageous influence on the durability of the soldering. These are readily occluded by the fused solder, and give rise to the formation of pores and pipes in the soldered joint, and, as a result of electro-chemical processes between the soldered joint and the aluminum, lead in a very short time to the destruction of the union. It is apparent from all the foregoing that durable satisfactory solderings cannot be made with such soldering agents.

Ammonium chloride, which has also been proposed for this purpose, shows a satisfactory corroding power and does not possess the disadvantage of leaving residues at the soldered place; nevertheless it cannot be used for the soldering of aluminum for it has no melting point, but immediately vaporises in the heat of the soldering operation and then sublimes. For this reason it cannot form a so-called fluxing agent, that is to say cannot bring about the flow of the fused solder metal over the whole soldering place in the cracks between the metal articles to be joined. The thing to do would be to equalise out this property of ammonium chloride by addition of a fluxing agent, as has already been proposed in the case of the usual soldering agents. But here again success was not obtained because ammonium chloride, as a consequence of its immediate volatilisation, is not in a position to corrode with sufficient certainty the whole of the surface to be soldered.

The other processes heretofore proposed, which all set out from the idea of preliminarily preparing the aluminum surfaces to be joined for the reception of the solder by means of a separate operation prior to the soldering operation proper, have scarcely found acceptance, on the one hand because of the extra work entailed, and on the other hand no certain success is guaranteed because the short time elapsing between the preliminary preparation of the place to be soldered and the supply of the soldering metal frequently suffices for oxide skins to form again.

The object of the present invention is to avoid the above mentioned drawbacks attending the soldering of aluminum and to render possible the rapid production of soldered places and joints in which corrosion cannot be already brought about right from the start by occluded residues of fluxing agent.

The invention sets out from the knowledge that ammonium chloride itself possesses a series of properties which are necessary in the soldering of aluminum since its base $NH_3$ completely disappears in the heat of the soldering operation. The corroding agent in the case of ammonium chloride is undoubtedly the hydrochloric acid, that is to say the hydrogen halide acid.

Extensive experiments have now shown that on substituting the ammonia hydrogen atoms of ammonium chloride by means of aliphatic alkyl groups (methyl residues, ethyl residues and so forth) organic derivatives of ammonium chloride are obtained which have a clearly defined melting point. Above this melting point there is a temperature limit at which these organic ammonium chloride derivatives decompose into the free base and free acid. At this moment the acid corrodes the aluminum surface and the excess vaporising acid immediately combines with the organic base again above the soldering place and as a result becomes harmless.

It has already been proposed to use organic bases or derivatives thereof for ordinary soldering purposes. In this general form, however, the known proposal cannot in any case be used for aluminum soldering as will be seen from the following:

Owing to the difficulty in attacking aluminum oxide the corroding agent must contain hydrogen halide acids. Of the other mineral acids sulphuric acids does not come into consideration since it withdraws water, that is to say chars, the organic base. The resulting carbon, or brown slimy residue, prevents the flow of the soldering metal or even access of the hydrogen halide acid to the aluminum surface. Nitric acid acts similarly; it completely burns the organic base. Other acids have the disadvantage of melting and boiling points which are too high, and of leaving behind oxidic solid residues which prevent the flow of the solder (as for example is the case with phosphoric acid).

From this it will be seen that of the organic compounds only those of the hydrogen halide acids come into consideration.

Furthermore the choice of the organic-base also is not to be regarded as immaterial. The reason for this probably lies in the high heat conductivity of aluminum, which prevents the soldering agent always being maintained with certainty at a sufficient temperature. Bases which are rich in carbon and nitrogen leave behind a brown smeary residue at the soldering place for example, which prevents a satisfactory soldering operation. The oxygen-rich compounds likewise lead to the formation of such residues or else possess other drawbacks.

According to the invention the consequence is reached from all this that the halogen salts of hydrogen-rich amine bases and derivatives thereof are useful soldering agents for aluminum. By hydrogen-rich compounds are to be understood those which possess a very high hydrogen content in relation to the carbon content of the molecule. The comparison between the richness in carbon and the richness in hydrogen is not based on the percentage content but on the number of carbon and hydrogen atoms present in the molecule.

These compounds and their derivatives, in addition to their outstanding corroding power, also have the advantage that they are very pronounced fluxing agents to which falls the task, so important in the case of the soldering of aluminum, of promoting the immediate flow of the solder on the corroded places.

To the hydrogen-rich halogen salts of amine bases and their derivatives which possess the above mentioned properties, belong the compounds of all amine bases of the aliphatic series, of the hydrogenated, carbocyclic and heterocyclic series, as well as the compounds of those carbocyclic amine bases the carbon richness of which by aliphatic substitution in the nucleus or on the base nitrogen has been compensated for by the hydrogen atoms introduced.

The following may be mentioned as examples of the soldering agent provided by the invention:

1. Methylamine hydrochloride.
2. Dimethylamine hydrochloride.
3. Triethylamine hydrochloride or hydrofluoride or hydrobromide.
4. Ethylamine hydrochloride.
5. Diethylamine hydrobromide.
6. Triethylamine hydrochloride.
7. Propylamine hydrochloride.
8. Butylamine hydrochloride.
9. Ethylmethylamine hydrochloride.
10. Diethylmethylamine hydrochloride.
11. Diethylpropylamine hydrochloride.
12. Dipropylmethylamine hydrochloride.
13. Methylaniline hydrochloride.
14. Dimethylaniline hydrochloride.
15. Ethylaniline hydrochloride.
16. Diethylaniline hydrochloride.
17. Cyclohexylamine hydrochloride.
18. Piperidine hydrochloride.

Of the several halogens the chlorides are the cheapest, and the fluorides have the property of promoting flow to high degree, whilst many bromides are unsuitable on account of their hygroscopic properties. The iodides are usually too expensive.

All the disadvantage of the inorganic soldering agents heretofore used in the soldering of aluminum disappear with the new agents. Owing to the very low temperature at which these compounds decompose and act both corrosively as well as to promote the flow, the soldering place requires to be heated only a little above the melting point of the solder, and in fact to about 275° C. Corrosions arise only to the unavoidable extent such as is brought about by the potential difference between the soldering metal and the aluminum in the presence of moisture. The corroding agent itself, however, does not lead to any corrosion. The reason for this interesting property probably lies in the fact that a part of the halogen acid is split off at the low soldering temperature and the aluminum can corrode for the soldering, whilst the excess of vaporising hydrochloric acid forthwith unites again in the air with the likewise vaporising base to form a neutral salt. Corrosions due to the occlusion of residual decomposition substances are not possible since no residues form, such as is the case with inorganic soldering agents, but on the contrary the base constituents vaporise completely.

The amine bases referred to, as well as their derivatives, may be used in the most different forms in the soldering of aluminum, namely as the substance itself, the solder being strewed on, as a dry or moist, powdery or pasty mixture with granules or dust of soldering metal in combination with the latter in the form of soldering pellets, as well as in the form of the known hollow wires of soldering metal which contain the corroding and fluxing agent in their interior. The soldering proceeds particularly well with the agent when the latter is employed in the form of a metal paste, for the following advantages are obtained hereby which are just those of importance in the soldering of aluminum:

1. By the intimate admixture of soldering agent and soldering metal the immediate attack of the soldering metal is ensured with certainty at the instant in which the fluxing or corroding agent is active.
2. The addition of a plastifying agent which is necessary in the paste form of the soldering agent has a thermally insulating action during the cooling of the soldering metal so that a more uniform smooth soldered joint can form. The reducing action maintained in the literature has no practical importance.

As an example of the invention a pasty mixture of metal dust of an alloy of 40% tin, 40% zinc and 20% cadmium, or 60% tin and 40% zinc, or pure tin, with 22% of the corroding agent, for example trimethylamine hydrochloride, and 6 to 8% of petroleum jelly as plastifying agent has proved very suitable.

It has, however, been found, that when using a corrosive agent according to the invention in combination with a soldering metal, for instance the soldering metal first mentioned in the above example, the pasty mixture is not durable, but tends to decompose which causes first of all a deterioration of the otherwise good soldering properties and finally results in a complete uselessness of the pasty mixture.

Extensive researches carried out to find the cause of these phenomena led to the following knowledge: If the triethylamine hydrochloride is used as the halogen acid salt of the hydrogen-rich organic amine base then the chlorine is, by the atmospheric moisture already, ionically split off according to about the following formula:

$$(CH_3)_3 NHCl = (CH_3)_3 NH^+ + Cl^-$$

This chlorine in the form of ion chloride combines with the zinc of the soldering dust to zinc chloride. Zinc chloride is highly hygroscopic and therefore withdraws still more water which, due to its hydrolytic action, forms new hydrochloric acid from the basic-hydrochlorid present in the pasty mixture. This hydrochloric acid again attacks the zinc alloy. As soon as a very small amount of zinc chloride has once been formed, the deterioration process must proceed with increasing speed.

It has been mentioned above to add a plastifying agent to the paste formed of the corrosive agent and the soldering metal. If this plastifying agent consists of Vaseline, paraffin oil, Vaseline oil, oil of turpentine or similar non-hygroscopic substances, then the metal dust is covered by this substance with a kind of protecting envelope and the decomposition cannot take place so easily. With the use of pure tin as soldering metal also the phenomena mentioned did not show in a manner leading to a complete uselessness of the soldering agent.

Now, it is highly desirable to render the usefulness of the soldering paste independent on a safe seal against the atmospheric moisture and the quality of the plastifying agent respectively. According to a further improvement of the novel soldering paste the above explained decomposition of the substances present in the soldering paste may be obviated. This is effected by such a combination of the hydrogen-rich organic amine bases with the halogen acid salt to a double salt or a complex combination, that the halogen is split off not as an ion, but as an ion combined with a base, for instance as a chlorostannic ion.

According to the invention, therefore, profit is taken from the fact, that the so-called double salts or better the complex combinations, due to the concentration of their by-valences by other atom groups, far better bind the individual elements, in the present case the halogen, which in the above examples is ionically bound only.

It has, however, been difficult to find a base capable of binding the halogen within a complex combination in this manner. The solution of this problem was rendered possible in the manner indicated above; i. e. by the use of a halogen acid salt of a hydrogen-rich organic amine base or its derivates as a corrosive agent. Tin was found on searching a base capable of effecting the binding of the halogen within the complex combination according to the invention. This metal itself seems to be already useful, because in metallic form it constitutes the solder proper, and because during soldering it can relatively easily be reduced if it is used in the form of a combination. The well known reaction solders make use of this property of the tin.

Of the tin compounds tin tetrachloride ($SnCl_4$) has the property to easily combine with other compounds to double salts or complex combinations. In particular, tin easily combines with ammonium chloride and forms with the organic derivatives of the latter, i. e. with the amine base hydrochloride, well defined complexes capable of being crystallized out. Stannic tetrachloride with trimethylamine hydrochloride forms a complex combination of the formula:

$$SnCl_4 . 2(CH_3)_3 NHCl$$

or written otherwise:

$$[(CH_3)_3 NH]_2 . SnCl_6$$

This compound, chlorostannic trimethylamine, is a white non-hygroscopic salt which in aqueous solution decomposes in the ions $$2[(CH_3)_3NH]^+ \text{ and } SnCl_6^-$$

As may be seen from the formula, the ionic split does not result in the formation of the ion chlorine, but in the formation of the ion $SnCl_6$. This ion is inactive as far as the metal dust in a soldering paste for the soft soldering of aluminum comes into consideration. Soldering pastes for the soft soldering of aluminum made according to the invention have proved to be durable for a long period of time in a moist atmosphere even if the metal dust contained a high percentage of zinc. In case of a metal dust of pure tin no decomposition whatever could be ascertained.

If according to the invention a tin containing complex combination is used, then the corrosive agent itself acts already as reaction solder, i. e. the tin liberated during carrying out the soldering process effects the soldering.

In many cases the amount of tin liberated may alone be sufficient for effecting the soldering. To warrant an easier handling and a greater safety of the action it is, however, to be recommended to add some additional soldering metal in one of the known forms, preferably in the form of a paste, to the soldering agent.

For the manufacture of the complex combination substantially all the hydrogen-rich organic amine bases mentioned above or their derivatives are suitable as long as they still show a perceptible liquid phase in their form as double salt. Some of these bases appear to lose this phase in the form of a complex combination. For instance, mono methylamine hydrochloride in combination with stannic chloride, when heated, directly passes over from the solid state to the gaseous state, so that it cannot come to action at the soldering junction and, therefore, is not adapted for the manufacture of a soldering agent according to the invention.

What I claim is:

1. A soldering composition for the soft soldering of aluminum comprising a complex compound containing tin and a halide of a hydrogen-rich amine base, said complex compound being adapted to split off the halogen as tin halide during the soldering procedure.

2. A soldering composition according to claim 1, the tin being present as tin chloride.

3. A soldering composition according to claim 1, the hydrogen-rich amine base being selected from the group composed of methylamine hydrochloride, dimethylamine hydrochloride, trimethylamine hydrochloride or hydrofluoride or hydrobromide, ethylamine hydrochloride, diethylamine hydrobromide, triethylamine hydrochloride, propylamine hydrochloride, butylamine hydrochloride, ethylmethylamine hydrochloride, diethylmethylamine hydrochloride, diethylpropylamine hydrochloride, dipropylmethylamine hydrochloride, methylaniline hydrochloride, dimethylaniline hydrochloride, ethylaniline hydrochloride, diethylaniline hydrochloride, cyclohexylamine hydrochloride and piperidine hydrochloride.

4. A soldering composition according to claim 1, characterized by the addition of a plastifying agent.

WILHELM HAGEMANN.